(12) United States Patent
Sagayama

(10) Patent No.: US 9,815,444 B2
(45) Date of Patent: Nov. 14, 2017

(54) ABS HYDRAULIC UNIT

(71) Applicant: Robert Bosch GmbH, Stuttgart (DE)

(72) Inventor: Kosaku Sagayama, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/431,423

(22) PCT Filed: Sep. 19, 2013

(86) PCT No.: PCT/JP2013/075284
§ 371 (c)(1),
(2) Date: Mar. 26, 2015

(87) PCT Pub. No.: WO2014/050691
PCT Pub. Date: Apr. 3, 2014

(65) Prior Publication Data
US 2015/0246663 A1    Sep. 3, 2015

(30) Foreign Application Priority Data

Sep. 28, 2012 (JP) ................. 2012-216277

(51) Int. Cl.
*B60T 8/40* (2006.01)
*B60T 8/36* (2006.01)
*F04B 9/04* (2006.01)
*B60T 17/02* (2006.01)
*B60T 8/176* (2006.01)

(52) U.S. Cl.
CPC ............ *B60T 8/4022* (2013.01); *B60T 8/176* (2013.01); *B60T 8/368* (2013.01); *B60T 17/02* (2013.01); *F04B 9/04* (2013.01)

(58) Field of Classification Search
CPC ........ B60T 8/176; B60T 8/368; B60T 8/4022; B60T 17/02; F04B 9/04
USPC .............................. 303/116.4, 119.3, DIG. 10
See application file for complete search history.

(56) References Cited

U.S. PATENT DOCUMENTS 5,529,389 A * 6/1996 Sekiguchi ............... B60T 8/368
                                                            137/884
5,947,567 A * 9/1999 Jonner .................. B60T 8/4022
                                                            303/115.4
6,746,089 B2   6/2004 Nakazawa
(Continued)

FOREIGN PATENT DOCUMENTS

CN         102653238         9/2012
EP         0449320 A1       10/1991
(Continued)

OTHER PUBLICATIONS

WO-2016009905-A1 English abstract.*
(Continued)

*Primary Examiner* — Melody M Burch
(74) *Attorney, Agent, or Firm* — Michael Best & Friedrich LLP

(57) ABSTRACT

A miniaturized ABS hydraulic unit is provided. In an ABS hydraulic unit 100 where a pump 12 and valves 13, 14 are disposed in the inside of a hydraulic circuit 1 for making a hydraulic brake perform braking, and an antilock brake control of the hydraulic brake is performed by controlling the pump 12 and the valves 13, 14, a motor 11 for operating the pump 12 is configured to operate the pump 12 by way of a planetary gear mechanism 30.

10 Claims, 8 Drawing Sheets

(56) References Cited

U.S. PATENT DOCUMENTS

| | | | | |
|---|---|---|---|---|
| 2006/0151265 | A1* | 7/2006 | Honjou | B66D 5/26 188/170 |
| 2007/0163526 | A1* | 7/2007 | Sugiura | F01L 1/352 123/90.17 |
| 2007/0247001 | A1* | 10/2007 | Nakano | B60T 1/10 303/157 |
| 2008/0058146 | A1* | 3/2008 | Pizzichil | F04D 13/022 475/72 |
| 2008/0236532 | A1* | 10/2008 | Smith | F01L 1/18 123/90.44 |
| 2009/0055061 | A1* | 2/2009 | Zhu | B60K 6/48 701/55 |
| 2009/0272596 | A1* | 11/2009 | Thomson | B60K 7/0015 180/305 |
| 2010/0018808 | A1* | 1/2010 | Gloge | F16H 61/0031 184/6.12 |
| 2016/0264158 | A1* | 9/2016 | Suzuki | B61H 5/00 |

FOREIGN PATENT DOCUMENTS

| | | | |
|---|---|---|---|
| JP | H09158814 | | 6/1997 |
| JP | 2000142343 | | 5/2000 |
| JP | 2002370635 | | 12/2002 |
| JP | 2005289210 | A * | 10/2005 |
| JP | 2006007819 | | 1/2006 |
| JP | 2007168456 | A * | 7/2007 |
| JP | 2009214881 | | 9/2009 |
| KR | 20110024072 | | 3/2011 |

OTHER PUBLICATIONS

English Machine Translation for JP-2005289210.*
International Search Report for Application No. PCT/JP2013/075284 dated Dec. 3, 2013 (English Translation, 1 page).

* cited by examiner

ABS HYDRAULIC UNIT

BACKGROUND OF THE INVENTION

The present invention relates to an ABS hydraulic unit which performs an antilock brake control by controlling a fluid pressure in a hydraulic circuit for making a brake perform braking using a pump and a valve.

Conventionally, there has been known an ABS hydraulic unit which performs an antilock brake control by controlling a fluid pressure in a hydraulic circuit for making a brake perform braking using a pump and a valve (see JP-A-2002-370635, for example). In this type of an ABS hydraulic unit, in performing an antilock brake control, a fluid pressure of a brake fluid in the hydraulic circuit is boosted by a master cylinder. Accordingly, in performing such an antilock brake control, it is necessary for the pump to discharge a brake fluid at a pressure stronger than a fluid pressure of a brake fluid at a boosted pressure in the hydraulic circuit and hence, a large torque is necessary for driving the pump.

SUMMARY OF INVENTION

However, in the above-mentioned ABS hydraulic unit pertaining to the related art, it is necessary to use a large motor having the same size as the unit body for generating a large torque and hence, the size of the ABC hydraulic unit becomes extremely large.

It is an object of the invention to provide a miniaturized ABS hydraulic unit which can overcome the above-mentioned drawbacks which the related art has.

The invention is directed to an ABS hydraulic unit where a pump and a valve are disposed in the inside of a hydraulic circuit for making a hydraulic brake perform braking, and an antilock brake control of the hydraulic brake is performed by controlling the pump and the valve, wherein a motor for operating the pump is configured to operate the pump by way of a planetary gear mechanism.

In this case, the ABS hydraulic unit may further include: a circuit part in which the hydraulic circuit is disposed, wherein the circuit part may be disposed adjacent to the motor and the planetary gear mechanism. The circuit part may have a longitudinal direction thereof in an axial direction of the motor. The pump may be disposed at one end of the circuit part in the longitudinal direction. The motor and the planetary gear mechanism may be arranged adjacent to an ECU which is provided for controlling the pump and the valve. The valve may be arranged between the circuit part and the ECU, and a direction along which the valve is assembled into the circuit part and an axial direction of the motor may be set approximately orthogonal to each other.

According to the invention, it is possible to realize a miniaturized ABS hydraulic unit.

DETAILED DESCRIPTION

Hereinafter, one preferred embodiment of the invention is explained with reference to drawings.

Figure 1:
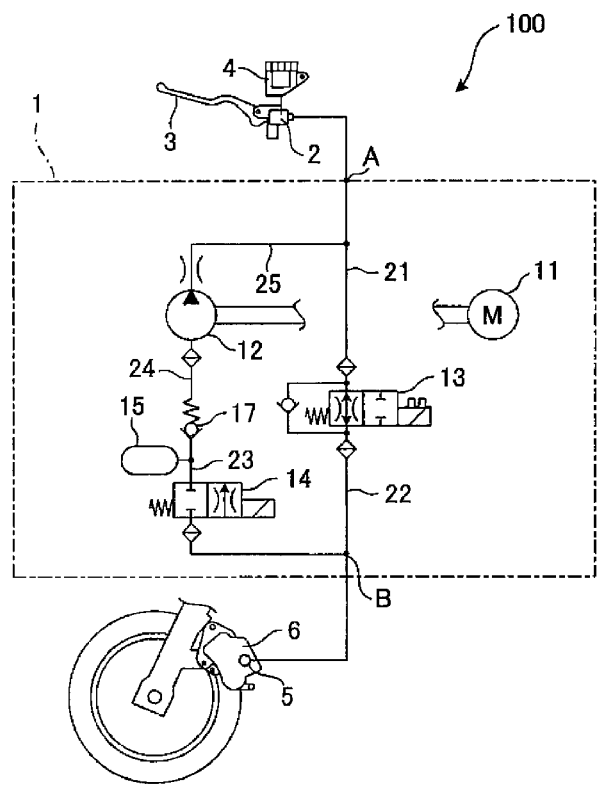
FIG. 1 is a circuit diagram showing a hydraulic circuit of an ABS hydraulic unit according to this embodiment.

FIG. 1 is a circuit diagram showing a hydraulic circuit of an ABS hydraulic unit according to this embodiment. In a motorcycle according to this embodiment, an ABS (antilock braking system) is mounted only on a front wheel so that the ABS hydraulic unit 100 can perform an antilock brake control only with respect to the front wheel. Hereinafter, a hydraulic circuit 1 for the front wheel is explained.

The hydraulic circuit 1 is filled with a brake fluid, and is connected to a master cylinder 2 at a connection end A thereof A brake lever 3 is mounted on the master cylinder 2, and the master cylinder 2 is connected to a reservoir 4. Due to such a constitution, when a rider manipulates the brake lever 3 so as to apply braking to the front wheel, the master cylinder 2 discharges a brake fluid accumulated in the reservoir 4 to the hydraulic circuit 1.

On the other hand, the hydraulic circuit 1 is connected to a wheel cylinder 5 at a connection end B thereof The wheel cylinder 5 is mounted in a brake caliper 6 of the front wheel. The brake caliper 6 is operated along with the increase of a fluid pressure in the wheel cylinder 5 and applies a braking force to the front wheel.

The hydraulic circuit 1 connected between the master cylinder 2 and the wheel cylinder 5 includes: a motor 11; a pump 12; an inlet valve 13 (valve); an outlet valve (valve) 14; and an accumulator 15.

The inlet valve 13 is an electromagnetic valve provided with a solenoid. The inlet valve 13 is connected to the connection end A through a first pipe 21, and is also connected to the connection end B and the outlet valve 14 through a second pipe 22. The second pipe 22 is bifurcated in the middle thereof and hence, the second pipe 22 is connected to the inlet valve 13, the connection end B, and the outlet valve 14. The inlet valve 13 is connected to the first pipe 21 and the second pipe 22 by way of a filter respectively. A check valve is connected parallel to the inlet valve 13 between two filters. The check valve does not allow the flow of a brake fluid from the first pipe 21 into the second pipe 22 but allows the flow of a brake fluid from the second pipe 22 into the first pipe 21 even when the inlet valve 13 is closed. The inlet valve 13 is provided for controlling the flow of a brake fluid from the first pipe 21 to the second pipe 22 due to opening or closing of the inlet valve 13.

The outlet valve 14 is an electromagnetic valve provided with a solenoid. The outlet valve 14 is connected to the inlet valve 13 and the connection end B through the second pipe 22, and is connected to the accumulator 15 through a third pipe 23. The outlet valve 14 is connected to the second pipe 22 by way of a filter. The outlet valve 14 is provided for controlling the flow of a brake fluid from the second pipe 22 into the third pipe 23 due to opening or closing of the outlet valve 14.

The accumulator 15 is connected to the outlet valve 14 through the third pipe 23, and is connected to a suction side of the pump 12 through a fourth pipe 24. The accumulator 15 is connected to the fourth pipe 24 by way of a check valve 17. Due to the provision of the check valve 17, when a fluid pressure of a brake fluid exceeds a predetermined pressure, it is always the case that the brake fluid can flow from the accumulator 15 into the fourth pipe 24 but cannot flow from the fourth pipe 24 into the accumulator 15. The accumulator 15 is provided for accumulating a brake fluid which flows into the accumulator 15 from the third pipe 23, and to discharge an accumulated brake fluid into the fourth pipe 24.

The pump 12 is connected to the accumulator 15 through the fourth pipe 24, and is connected to the first pipe 21 through a fifth pipe 25. The pump 12 is connected to the fourth pipe 24 by way of a filter, and is connected to the fifth pipe 25 by way of a throttle. The pump 12 is operated when the motor 11 which is a DC motor is driven, and sucks a brake fluid from the fourth pipe 24 disposed at a suction side, and discharges the sucked brake fluid into the fifth pipe 25 disposed at a discharge side.

Figure 2:
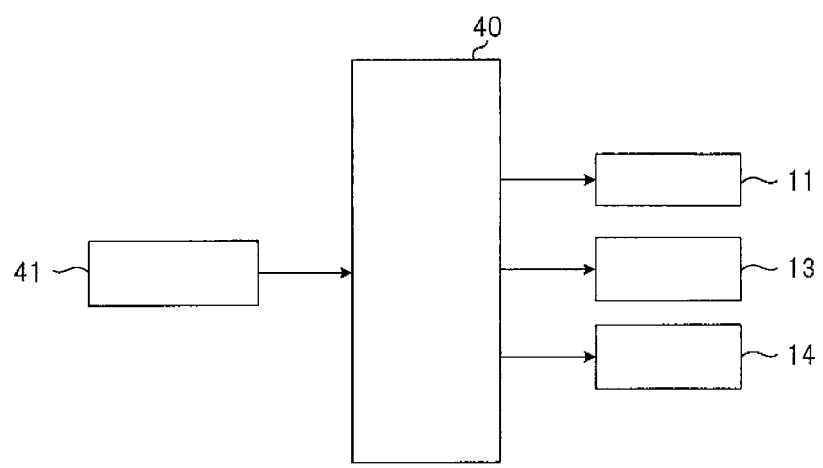
FIG. 2 is a block diagram showing the functional constitution of an ECU.

FIG. 2 is a block diagram showing the functional constitution of the ECU.

The ECU 40 controls the driving of the motor 11, an opening state or a closing state of the inlet valve 13, an opening state or a closing state of the outlet valve 14 and the like based on a rotational speed signal which the ECU 40 receives from a speed sensor 41 for detecting a rotational speed signal. The rotational speed signal corresponds to a rotational speed of the front wheel.

In a usual braking state, the ECU 40 stops the driving of the motor 11 so that the inlet valve 13 is held in an open state and the outlet valve 14 is held in a closed state. Due to such an operation, when a rider manipulates the brake lever 3 so that a pressure of a brake fluid is increased by the master cylinder 2 (see FIG. 1), the increase of the pressure of the brake fluid is transmitted to the wheel cylinder 5 (see FIG. 1) through the first pipe 21, the inlet valve 13, and the second pipe (see FIG. 1). Accordingly, the brake caliper 6 (see FIG. 1) is operated in an interlocking manner with the manipulation of the brake lever 3 (see FIG. 1) by the rider so that a braking force is applied to the front wheel.

At the time of performing braking where a braking force is generated by the brake caliper 6, the ECU 40 repeatedly determines whether or not the front wheel is in a locked state, that is, whether or not the front wheel excessively slips on a road surface based on a rotational speed signal acquired from the speed sensor 41. When the ECU 40 determines that the front wheel is in a locked state, the ECU 40 closes the inlet valve 13, opens the outlet valve 14, and operates the pump 12 by driving the motor 11 thus performing a control so as to lower a fluid pressure of a brake fluid transmitted to the wheel cylinder 5 by opening or closing the inlet valve 13 and the outlet valve 14. Due to such an operation, the ECU 40 controls a braking force of the brake caliper 6 by an antilock brake control thus releasing a locked state of the front wheel.

Figure 3:
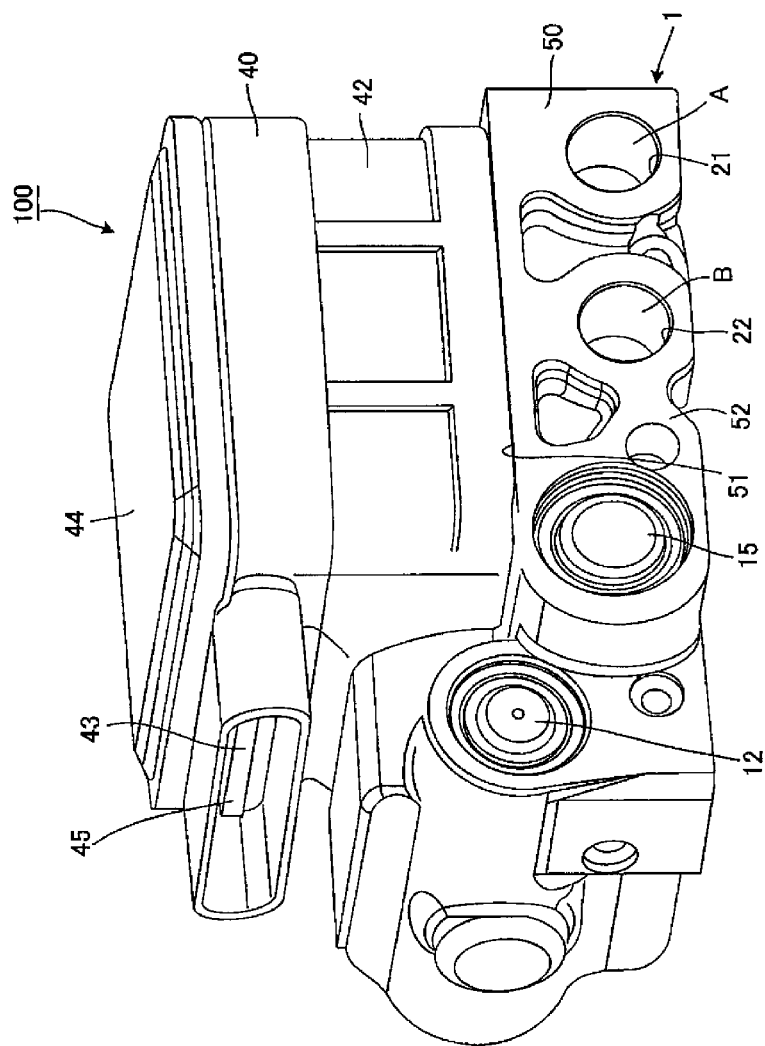
FIG. 3 is a perspective view showing the ABS hydraulic unit.
Figure 4:
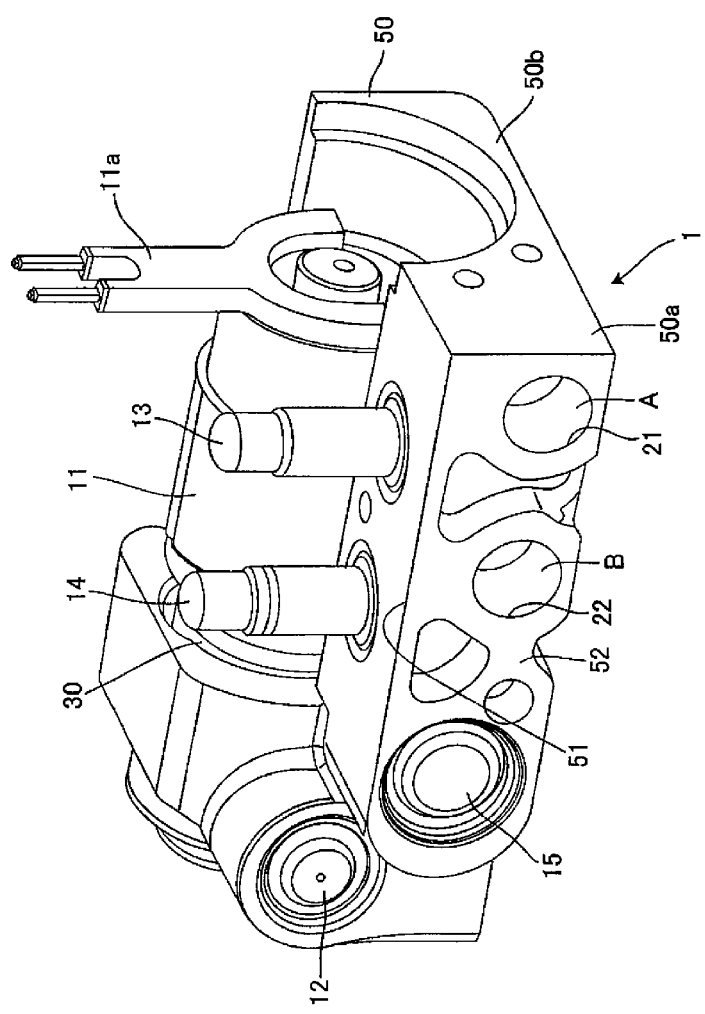
FIG. 4 is a perspective view showing a state where the ECU is removed from the ABS hydraulic unit.
Figure 5:
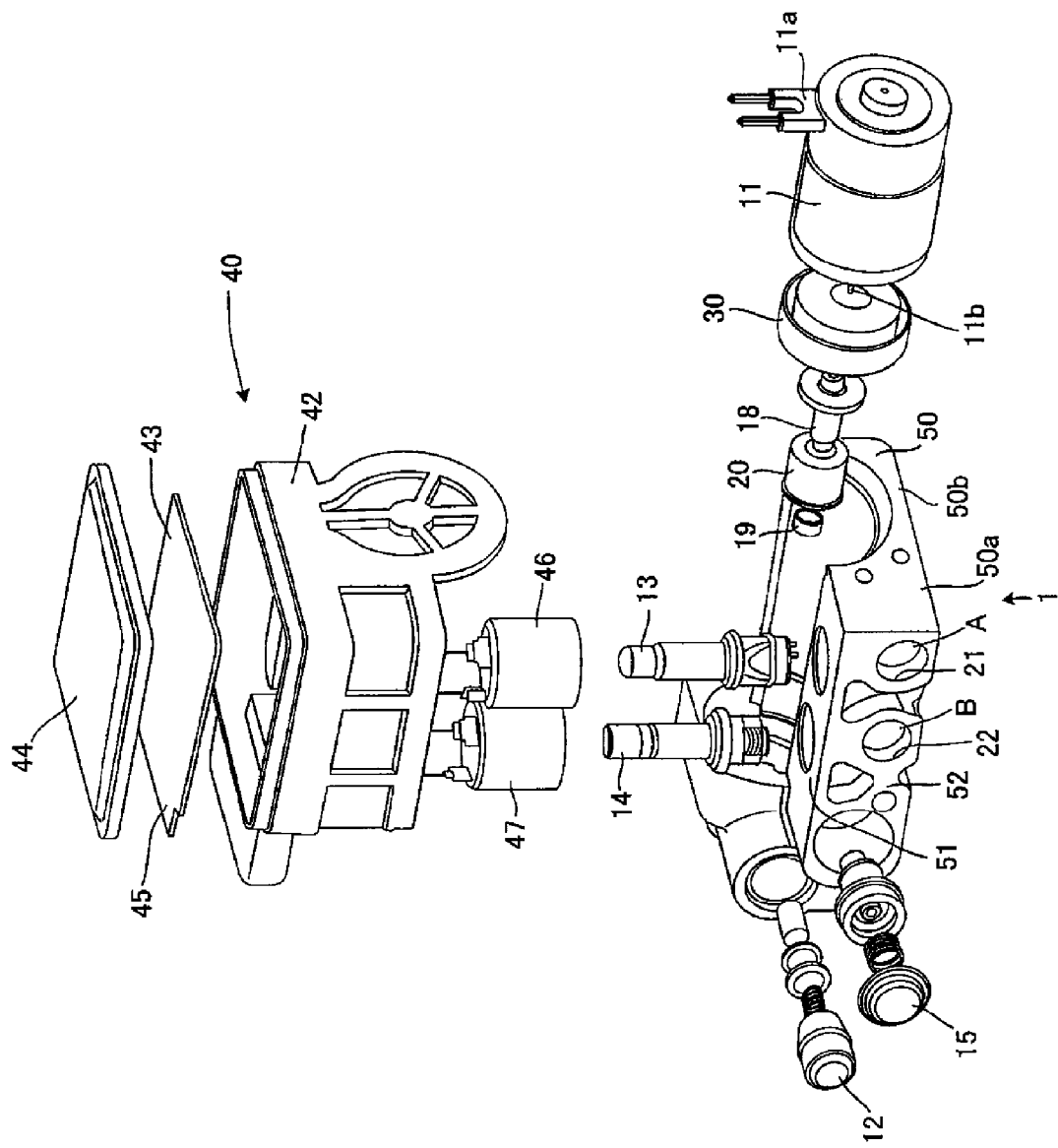
FIG. 5 is an exploded perspective view showing the ABS hydraulic unit.
Figure 6:
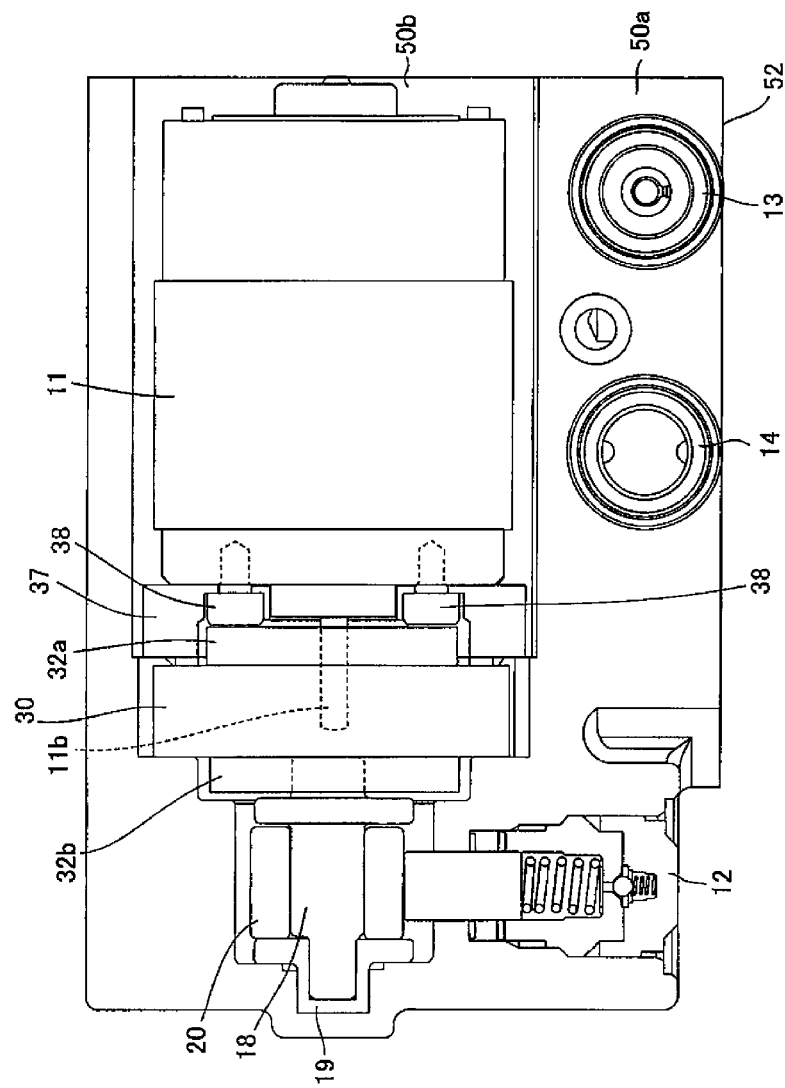
FIG. 6 is a cross-sectional view showing the ABS hydraulic unit.
Figure 7:
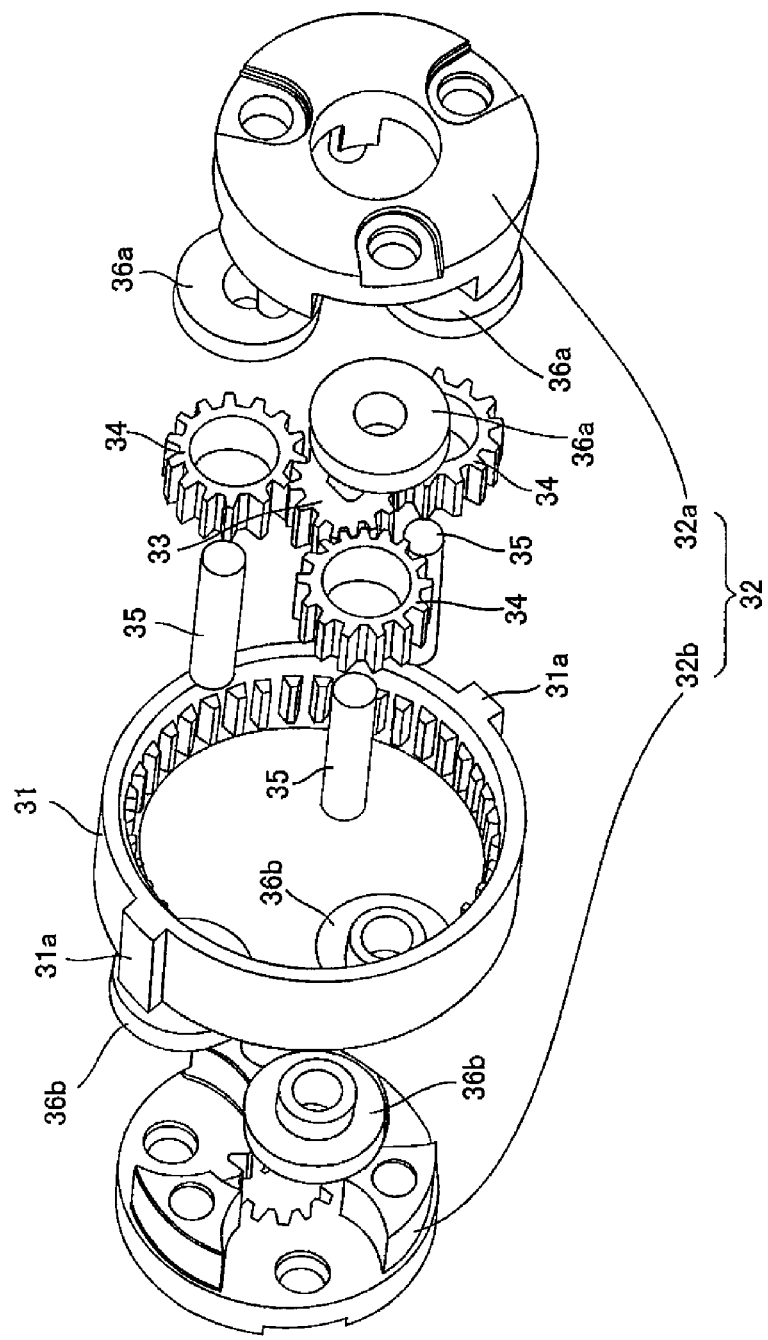
FIG. 7 is an exploded perspective view showing a planetary gear mechanism.

Hereinafter, the ABS hydraulic unit according to this embodiment is explained. FIG. 3 is a perspective view showing the ABS hydraulic unit, FIG. 4 is a perspective view showing a state where the ECU is removed from the ABS hydraulic unit, FIG. 5 is an exploded perspective view showing the ABS hydraulic unit, FIG. 6 is a cross-sectional view showing the ABS hydraulic unit, and FIG. 7 is an exploded perspective view showing a planetary gear mechanism.

As shown in FIG. 3, the ABS hydraulic unit is constituted by combining the ECU 40 and a unit body 50 to each other.

The unit body 50 is made of aluminum, and the hydraulic circuit 1 is formed in the inside of the unit body 50. In the unit body 50, on a pipe connecting surface 52 approximately orthogonal to an ECU mounting surface 51 on which the ECU 40 is mounted, the connection end A and the connection end B are formed. The pump 12 and the accumulator 15 are also mounted on the pipe connecting surface 52.

The ECU 40 is mounted on the ECU mounting surface 51 of the unit body 50, and a printed circuit board 43 is assembled into the inside of a case 42. In a state where the ECU 40 is mounted on the unit body 50, a connector 45 of the printed circuit board 43 projects toward a pump 12 side.

As shown in FIG. 4, the ABS hydraulic unit 100 is configured such that the motor 11, the inlet valve 13 and the outlet valve 14 are exposed when the ECU 40 is removed from the unit body 50.

As shown in FIG. 5, the unit body 50 has a circuit part 50a in which the hydraulic circuit 1 is disposed, and an arrangement part 50b on which the motor 11 and a planetary gear mechanism 30 are arranged. The circuit part 50a is formed in an approximately rectangular shape having a longitudinal direction thereof directed in the axial direction of the motor 11. The pipe connecting surface 52 is formed along the longitudinal direction of the circuit part 50a. On the other hand, the arrangement part 50b is formed in an approximately rectangular shape where a region of the arrangement part 50b in which the motor 11 and the planetary gear mechanism 30 are to be arranged is hollowed out. To enable the housing of the planetary gear mechanism 30 and the arrangement of the pump 12 approximately orthogonal to axes of the motor 11 and the planetary gear mechanism 30, portions of both the circuit part 50a and the arrangement part 50b in the vicinity of an area where the pump 12 is disposed are formed with a larger width than other portions of the circuit part 50a and the arrangement part 50b in the direction perpendicular to the ECU mounting surface 51.

The inlet valve 13 and the outlet valve 14 are assembled to the ECU mounting surface 51 of the circuit part 51a of the unit body 50 on which the ECU 40 is mounted in the direction approximately perpendicular to the ECU mounting surface 51. That is, pipes which extend from the master cylinder 2 and the wheel cylinder 5 and are connected to the connection end A and the connection end B respectively and the inlet valve 13 and the outlet valve 14 are inserted into the unit body 50 such that the pipes and the valves 13, 14 are arranged approximately perpendicular to each other.

The motor 11 and the planetary gear mechanism 30 are arranged on the arrangement part 50b such that axes of the motor 11 and the planetary gear mechanism 30 extend along the ECU mounting surface 51 and the pipe connecting surface 52 of the circuit part 50a. Since the area of the arrangement part 50b where the motor 11 and the planetary gear mechanism 30 are arranged is hollowed, the motor 11 and the planetary gear mechanism 30 and the hydraulic circuit 1 have the positional relationship where the motor 11 and the planetary gear mechanism 30 and the hydraulic circuit 1 are arranged adjacent to each other.

The motor 11 and the planetary gear mechanism 30, and the hydraulic circuit 1 are functionally connected to each other by way of the pump 12 mounted on an end portion of the unit body 50. That is, a drive force of the motor 11 drives an eccentric cam 18 arranged on an arrangement part 50b side after a rotational speed is decelerated by the planetary gear mechanism 30. One end of the eccentric cam 18 is supported by the planetary gear mechanism 30, and the other end of the eccentric cam 18 is supported by the unit body 50 by way of a bearing 19. The eccentric cam 18 is configured such that a needle bearing 20 is mounted on a shaft of the eccentric cam 18 and hence, the eccentric cam 18 can smoothly transmit a piston action to the pump 12. The eccentric cam 18 is rotated and transmits the piston action to the pump 12 so that the pump 12 discharges a brake fluid to the fifth pipe 25 of the hydraulic circuit 1 by moving the piston in a reciprocating manner. The pump 12 is operated by the eccentric cam 18 and hence, the pump 12 is arranged on one end of the circuit part 50a in the longitudinal direction.

A connection terminal 11a for connection with the ECU 40 is mounted on an end portion of the motor 11. All of the connection terminal 11a, the inlet valve 13, and the outlet valve 14 extend approximately perpendicular to the ECU mounting surface, and are electrically connected to the printed circuit board 43 of the ECU 40 when the ECU 40 is mounted on the ECU mounting surface 51.

The ECU 40 includes: the printed circuit board 43; the case 42 for housing the printed circuit board 43; a lid 44; and connection terminals 46, 47 mounted on the printed circuit board 43.

A CPU, a memory and the like are mounted on the printed circuit board 43, and the printed circuit board 43 controls the ABS hydraulic unit 100. The printed circuit board 43 has a connector 45. Accordingly, by connecting the connector 45 to a connector on a vehicle body side of a motorcycle on which the ABS hydraulic unit 100 is mounted (not shown in the drawing), various information such as a wheel speed can be transmitted between the ECU 40 and the vehicle body side.

The case 42 is configured such that the case 42 is closed by the lid 44 after the printed circuit board 43 is arranged in the case 42. A connecting portion 42a is formed on an end portion of the case 42 on a pump 12 side where the connector 45 of the printed circuit board 43 is exposed. A motor cover 42b having a circular shape which covers an end portion of the motor 11 is formed on an end portion of the case 42 on a motor 11 side.

Connection terminals 46, 47 are mounted on the printed circuit board 43. The connection terminal 46 is connected to the inlet valve 13, and the connection terminal 47 is connected to the outlet valve 14. Due to such a constitution, the printed circuit board 43 can control opening/closing of the inlet valve 13 and the outlet valve 14 by energizing or deenergizing the inlet valve 13 and the outlet valve 14 via the connection terminals 46, 47.

The motor 11 is arranged between the ECU 40 and the unit body 50 in a state where the motor 11 is covered by the case 42. As shown in FIG. 6, the motor 11 is fixed to the bracket 37 mounted on the unit body 50 by bolts 38, 38 in the vicinity of the pump 12. An output shaft 11b of the motor 11 is connected to the planetary gear mechanism 30 on a side opposite to the bracket 37.

As shown in FIG. 7, the planetary gear mechanism 30 which is connected between the motor 11 and the eccentric cam 18 includes: an inner gear 31, a planetary carrier 32; a sun gear 33; and a planetary gear 34.

A rotation stopper 31a is formed on the inner gear 31, and the rotation stopper 31a is fixed to the unit body 50 (see FIG. 5) in the vicinity of the pump 12 (see FIG. 5). The inner gear 31 is formed in a ring shape, and teeth are formed on and along an inner peripheral surface of the inner gear 31.

The planetary carrier 32 is formed in a disk shape by combining a first planetary carrier 32a and a second planetary carrier 32b, and is arranged in the inside of the inner gear 31. The first planetary carrier 32a and the second planetary carrier 32b are combined such that these carriers are not rotatable relative to each other. That is, the first planetary carrier 32a and the second planetary carrier 32b are configured to be rotated integrally. In the inside of the planetary carrier 32, three gear shafts 35 are mounted in a state where the gear shafts 35 extend between the first planetary carrier 32a and the second planetary carrier 32b. A pair of gear holding portions 36a, 36b is mounted on each one of these gear shafts 35 in a state where the gear holding portions 36a, 36b are rotatable about an axis of the gear shaft 35. The planetary gears 34 are mounted between one such pair of gear holding portions 36a, 36b. These three planetary gears 34 are mounted on the planetary carrier 32 at intervals of approximately 120 degrees about the axis. Some teeth of respective planetary gears 34 project from an outer periphery of the planetary carrier 32 in a state where the planetary gears 34 are mounted on the planetary carrier 32. Due to such a constitution, in a state where the planetary carrier 32 is assembled into the inside of the inner gear 31, three planetary gears 34 are brought into a state where three planetary gears 34 constantly mesh with the teeth formed on and along the inner peripheral surface of the inner gear 31.

On the planetary carrier 32, the sun gear 33 is arranged at the center of three planetary gears 34. In a state where the sun gear 33 is assembled into the planetary carrier 32, the sun gear 33 is brought into a state where the sun gear 33 constantly meshes with three planetary gears 34.

A hole is formed in the first planetary carrier 32a in the vicinity of the axis of the first planetary carrier 32a, the output shaft 11b of the motor 11 extends in the inside of the planetary carrier 32 by passing through such a hole, and the sun gear 33 is assembled to the output shaft 11b of the motor 11. The sun gear 33 is mounted on the outer shaft 11b such that the sun gear 33 is not rotatable relative to the output shaft 11b. That is, the sun gear 33 and the output shaft 11b are configured to be rotated integrally.

On the other hand, a hole is formed in the second planetary carrier in the vicinity of an axis of the second planetary carrier, and teeth are formed on and along an inner peripheral surface of the hole. Due to such a constitution, the eccentric cam 18 assembled into the second planetary carrier such that teeth of the eccentric cam 18 mesh with the teeth formed in the hole is configured to be rotated integrally with the planetary carrier 32.

Due to the above mentioned constitution, in the planetary gear mechanism 30, when the sun gear 33 assembled to the output shaft 11 is rotated by a drive force of the motor 11, three planetary gears 34 which mesh with the sun gear 33 are respectively rotated about the gear shaft 35 in the direction opposite to the rotating direction of the sun gear 33. Since three planetary gears 34 also mesh with the inner gear 31, three planetary gears 34 are moved along the inner peripheral surface of the inner gear 31 along with the rotation of the planetary gears 34. At this stage of operation, three planetary gears 34 are moved while being rotated in the inside of the inner gear 31 in the same direction as the rotating direction of the sun gear 33. Since three planetary gears 34 are assembled into the planetary carrier 32, the planetary carrier 32 is moved while being rotated in the inside of the inner gear 31 integrally with three planetary gears 34. Due to such operations, the eccentric cam 18 which is integrally rotated with the planetary carrier 32 is rotated in the same direction as the sun gear 33. In the planetary gear mechanism 30 according to this embodiment, a speed reduction rate is set such that an output is outputted from the eccentric cam 18 with a rotational speed which is approximately ⅕ of a rotational speed of the output shaft 11*b* of the motor 11, and the output is outputted from the eccentric cam 18 with a torque which is approximately 5 times larger than a torque of the output shaft 11*b* of the motor 11*b*. That is, for example, when the motor 11 is rotated at 15000 rpm (rotation per minute), the eccentric cam 18 is rotated at 3000 rpm, while when the motor 11 is rotated at 20000 rpm, eccentric cam 18 is rotated at 4000 rpm. The torque which is 10N·cm at the output shaft 11*b* of the motor 11 becomes 50N·cm at the eccentric cam 18. The motor 11 operates the pump 12 by way of the planetary gear mechanism 30.

Figure 8:
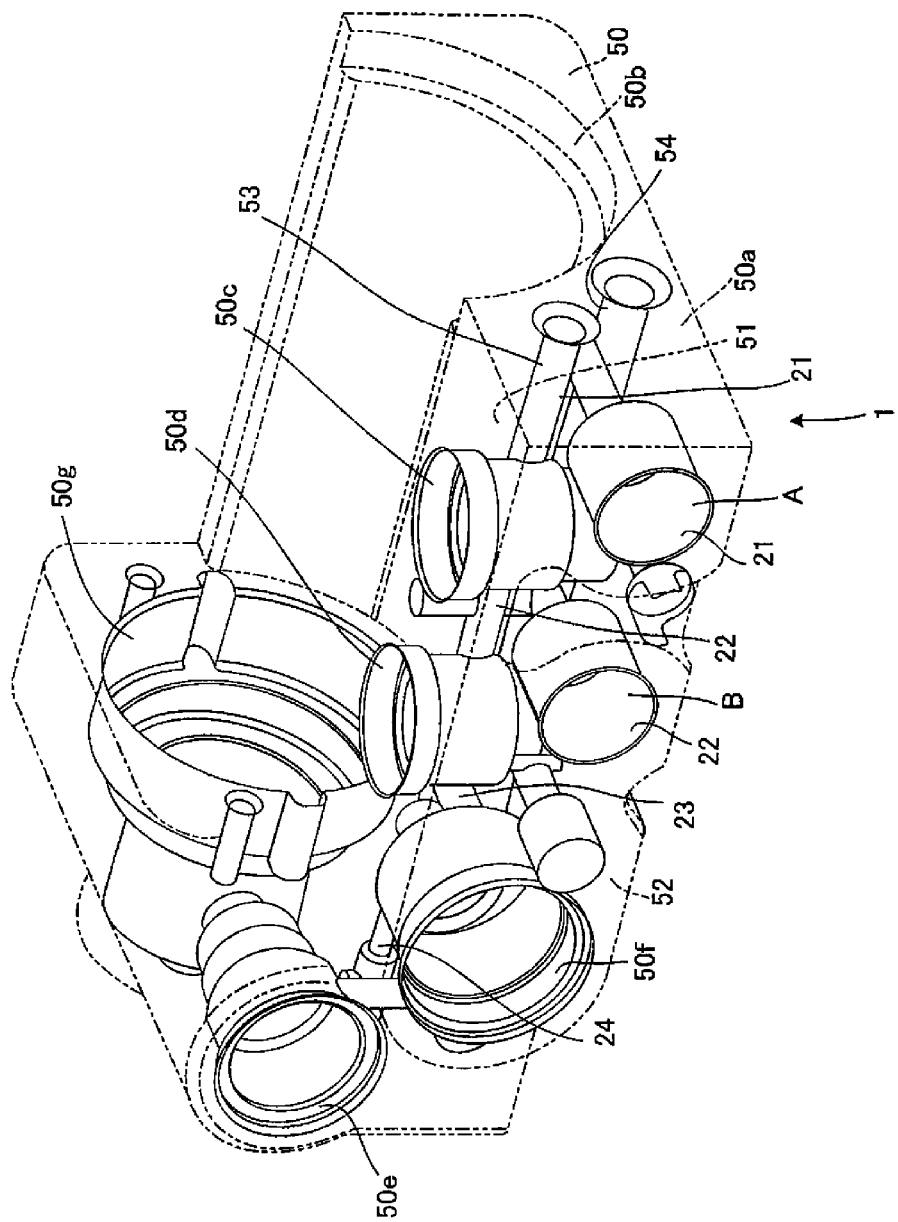
FIG. 8 is a perspective view as viewed from a pipe connecting surface side where a unit body is schematically described.
Figure 9:
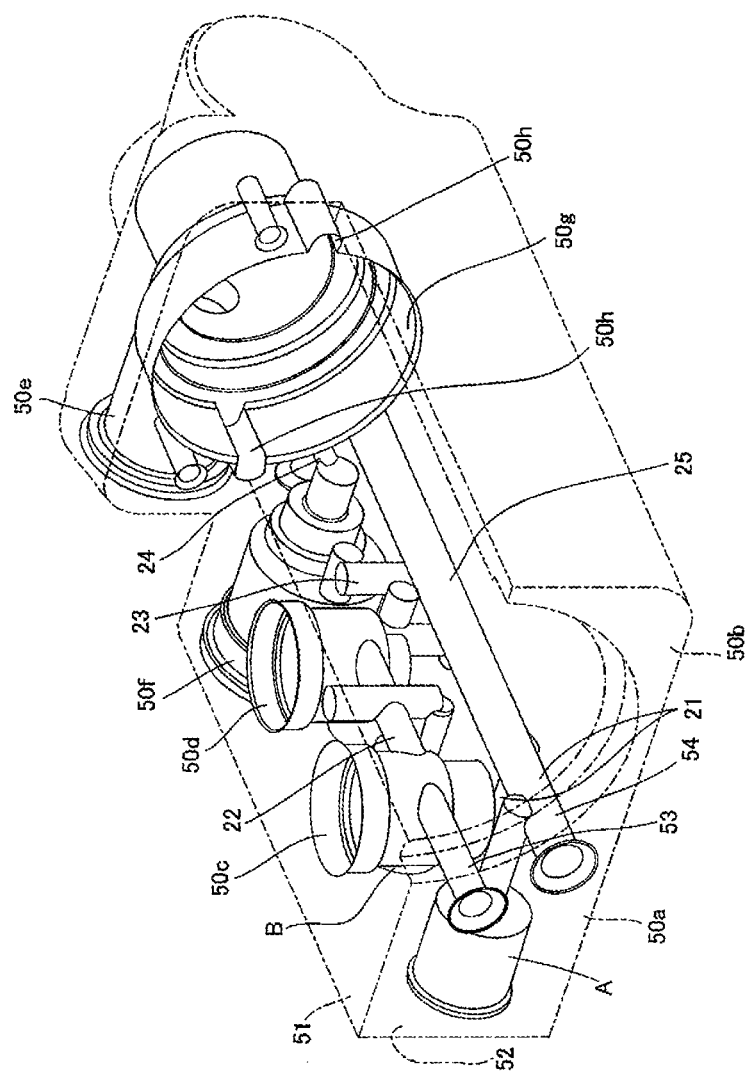
FIG. 9 is a perspective view as viewed from a back surface side of the pipe connecting surface where the unit body is schematically described.

FIG. 8 is a perspective view as viewed from a pipe connecting surface side where the unit body is schematically described, and FIG. 9 is a perspective view as viewed from a back surface side of the pipe connecting surface where the unit body is schematically described. In FIG. 8 and FIG. 9, to facilitate the understanding of the invention, the hydraulic circuit 1 formed in the inside of the unit body 50 is made visible.

As shown in FIG. 8, the unit body 50 is configured such that, in an ECU mounting surface 51 of the circuit part 50*a*, a hole 50*c* for assembling the inlet valve 13 (see FIG. 5) from the pump 12(see FIG. 5) side and a hole 50*d* for assembling the outlet valve 14 (see FIG. 5) from a pump 12 side are formed. These holes formed in the ECU mounting surface 51 are formed approximately perpendicular to the ECU mounting surface 51 and hence, the inlet valve 13 and outlet valve 14 are configured to be assembled to the circuit part 51*a* approximately orthogonal to the axis direction of the motor 11.

On the other hand, the unit body 50 is also configured such that, in the pipe connecting surface 52 of the circuit part 50*a*, in order from a pump 12 (See FIG. 5) side, a hole 50*e* for assembling the pump 12, a hole 50*f* into which the accumulator 15 is assembled, a hole which constitutes the connection end B, and a hole which constitutes the connection end A are formed. These holes formed in the pipe connecting surface 52 are formed approximately perpendicular to the pipe connecting surface 52.

Further, as shown in FIG. 9, the unit body 50 is also configured such that, in a surface which is approximately orthogonal to the ECU mounting surface 51 and the pipe connecting surface 52, a first horizontal hole 53 and a second horizontal hole 54 are formed. These first horizontal hole 53 and second horizontal hole 54 are formed along the ECU mounting surface 51 and the pipe connecting surface 52, that is, along the longitudinal direction of the circuit part 50*a*. The first horizontal hole 53 and second horizontal hole 54 are formed straight approximately parallel to the axis of the motor 11.

The first horizontal hole 53 is formed so as to penetrate the hole 50*c* in which the inlet valve 13 is assembled, the hole at the connection end B and the hole 50*d* in which the outlet valve 14 is assembled in this order. The first horizontal hole 53 is the second pipe 22 of the hydraulic circuit 1 (see FIG. 1). The hole 50*f* into which the accumulator 15 is assembled and the hole 50*e* into which the pump 12 is assembled are communicated with each other by holes formed from a pipe connecting surface 52 side and a back surface side of the ECU mounting surface 51 or the like thus forming the third pipe 23 and the fourth pipe 24 (see FIG. 1).

On the other hand, the second horizontal hole 54 is formed with a diameter larger than a diameter of the first horizontal hole 53, and is formed so as to be communicated with the hole into which the pump 12 is assembled and the hole at the connection end A. The second horizontal hole 54 constitutes the first pipe 21 and the fifth pipe 25 of the hydraulic circuit 1 (see FIG. 1). The hole at the connection end A and the hole 50*c* into which the inlet valve 13 is assembled have deep portions thereof respectively connected to the second horizontal hole 54, while the first pipe 21 is formed as a pipe which is connected to the hole 50*c* from the hole at the connection end A through the second horizontal hole 54. These holes are formed by embedding portions which are not necessary for forming the holes after boring.

In the unit body 50, a hole 50*g* for storing the eccentric cam 18, the bearing 19 and the planetary gear mechanism 30 is formed in the arrangement part 50*b*. A pair of recessed portions 50*h* is formed in the hole 50*g*, and the rotation stopper 31*a* of the inner gear 31 is fitted into the pair of recessed portions 50*h*.

In this embodiment, the ABS hydraulic unit 100 is configured such that the motor 11 operates the pump 12 by way of the planetary gear mechanism 30. Due to such a constitution, the pump 12 can be driven with a small torque so that a miniaturized motor can be used as the motor 11 whereby the ABS hydraulic unit 100 can be miniaturized. In this case, a value of an electric current used for driving the motor can be lowered by using a miniaturized motor. Further, by lowering such an electric current value, an area of a pin of a connector or the like for supplying electricity to the motor can be made small. Accordingly, the ABS hydraulic unit 100 can be further miniaturized.

Further, in this embodiment, the ABS hydraulic unit 100 is configured such that the circuit part 50*a* is disposed adjacent to the motor 11 and the planetary gear mechanism 30, and the ECU 40 is mounted in an extending manner over both the circuit part 50*a* and the motor 11. Due to such a constitution, the ABS hydraulic unit 100 can decrease a width thereof in a direction perpendicular to the ECU mounting surface 51.

Although the invention has been explained based on the embodiment, the invention is not limited to the embodiment. For example, in this embodiment, also a motorcycle which performs an antilock brake control only on a front wheel is used. However, the invention is not limited to such a case. The invention is may be applicable to a motorcycle which performs an antilock brake control also on a rear wheel of the motorcycle. In this case, in the ABS hydraulic unit, the hydraulic circuits are arranged in symmetry with respect to the axis of the motor, and a pumps for a front wheel side and a pump for a rear wheel side may be operated by one motor.

REFERENCE SIGNS LIST

1: hydraulic circuit
2: master cylinder
3: brake lever
4: reservoir
5: wheel cylinder
6: brake caliper (hydraulic brake)
11: motor
11*a*: connection terminal
11*b*: output shaft
12: pump
13: inlet valve (valve)
14: outlet valve (valve)
15: accumulator
17: check valve
18: eccentric cam
19: bearing
20: needle bearing 21: first pipe
22: second pipe
23: third pipe
24: fourth pipe
25: fifth pipe
30: planetary gear mechanism
31: inner gear
31a: rotation stopper
32: planetary carrier
33: sun gear
34: planetary gear
35: gear shaft
36a: gear holding part
36b: gear holding part
37: bracket
38: bolt
40: ECU
42: case
42a: connecting portion
42b: motor cover
43: printed circuit board
44: lid
45: connector
46: connection terminal
47: connection terminal
50: unit body
51: ECU mounting surface
52: pipe connecting surface
53: first horizontal hole
54: second horizontal hole
100: ABS hydraulic unit

DRAWINGS (FIG. 2)
11: MOTOR
13: INLET VALVE
14: OUTLET VALVE
41: FRONT WHEEL SPEED SENSOR

The invention claimed is:

1. An anti-lock braking system (ABS) hydraulic unit comprising a pump and a valve in an inside of a hydraulic circuit for making a hydraulic brake perform braking, wherein an antilock brake control of the hydraulic brake is performed by controlling the pump and the valve, and wherein
a motor is provided with an output shaft coupled to the pump through a planetary gear mechanism for operating the pump through the planetary gear mechanism such that the pump is driven with a reduced rotational speed that is reduced by the planetary gear mechanism from a speed of the motor output shaft, and wherein
an eccentric cam is driven by the planetary gear mechanism at the reduced rotational speed, a side surface of the eccentric cam being inserted into a needle bearing and being operable to drive a reciprocating input action to the pump via the needle bearing, one end of the eccentric cam being rotated by the planetary gear mechanism and the other end of the eccentric cam being supported by a fixed bearing.

2. The ABS hydraulic unit according to claim 1, further comprising: a circuit part in which the hydraulic circuit is disposed, wherein the circuit part is disposed adjacent to the motor and the planetary gear mechanism.

3. The ABS hydraulic unit according to claim 2, wherein the circuit part has a longitudinal direction thereof in an axial direction of the motor.

4. The ABS hydraulic unit according to claim 3, wherein the pump is disposed at one end of the circuit part in the longitudinal direction.

5. The ABS hydraulic unit according to claim 2, wherein the motor and the planetary gear mechanism are arranged adjacent to an electronic control unit (ECU) which is configured to control the pump and the valve.

6. The ABS hydraulic unit according to claim 5, wherein the valve is arranged between the circuit part and the ECU, and a direction along which the valve is assembled into the circuit part and an axial direction of the motor are set approximately orthogonal to each other.

7. The ABS hydraulic unit according to claim 3, wherein the motor and the planetary gear mechanism are arranged adjacent to an electronic control unit (ECU) which is configured to control the pump and the valve.

8. The ABS hydraulic unit according to claim 7, wherein the valve is arranged between the circuit part and the ECU, and a direction along which the valve is assembled into the circuit part and an axial direction of the motor are set approximately orthogonal to each other.

9. The ABS hydraulic unit according to claim 4, wherein the motor and the planetary gear mechanism are arranged adjacent to an electronic control unit (ECU) which is configured to control the pump and the valve.

10. The ABS hydraulic unit according to claim 9, wherein the valve is arranged between the circuit part and the ECU, and a direction along which the valve is assembled into the circuit part and an axial direction of the motor are set approximately orthogonal to each other.

* * * * *